US011164086B2

(12) United States Patent
Tian et al.

(10) Patent No.: US 11,164,086 B2
(45) Date of Patent: Nov. 2, 2021

(54) REAL TIME ENSEMBLE SCORING OPTIMIZATION

(71) Applicant: International Business Machines Corporation, Armonk, NY (US)

(72) Inventors: Lei Tian, P.R. (CN); Yi Shao, Shaanxi (CN); Peng Xue, Xian (CN); Di Ling Chen, Beijing (CN); Wei Wu, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 651 days.

(21) Appl. No.: 16/029,724

(22) Filed: Jul. 9, 2018

(65) Prior Publication Data

US 2020/0012948 A1  Jan. 9, 2020

(51) Int. Cl.
*G06N 3/12* (2006.01)

(52) U.S. Cl.
CPC ................. *G06N 3/126* (2013.01)

(58) Field of Classification Search
CPC .......... G06N 3/12; G06N 3/126; G06N 5/003; G06N 5/00; G06N 20/20
See application file for complete search history.

(56) References Cited

U.S. PATENT DOCUMENTS

| 2014/0136165 | A1 | 5/2014 | Sarma et al. |
| 2014/0188768 | A1 | 7/2014 | Bonissone et al. |
| 2015/0227741 | A1 | 8/2015 | Permeh et al. |
| 2015/0253463 | A1 | 9/2015 | Narayanaswamy et al. |
| 2018/0060324 | A1 | 3/2018 | Clinton et al. |
| 2019/0034932 | A1* | 1/2019 | Sadaghiani ........... G06F 16/285 |

OTHER PUBLICATIONS

Gul et al. "Ensemble of a subset of kNN classifiers", Adv Data Anal Classif, 2016, p. 14.*
P. Mell, et al. *"The NIDT Definition of Cloud Computing"*, NIST Special Publication 800-145, Sep. 2011, Gaithersburg, MD.
Anonymous, *"Lazy Method for Fast Voting-Based Ensemble Scoring"* IPCOM000241735D, https://priorart.ip.com/IPCOM/000241735D, May 27, 2015.

* cited by examiner

*Primary Examiner* — Li Wu Chang
(74) *Attorney, Agent, or Firm* — Robert Shatto; Hye Jin Lucy Song; Heslin Rothenberg Farley & Mesiti PC

(57) ABSTRACT

Methods, computer program products, and systems are presented. The methods include, for instance: obtaining a request for a predicted ensemble score in real-time. A subset of base model instances is formed by use of a preconfigured priority policy. A fitness score of the formed subset, quantifying the accuracy of the subset, is calculated as a sum of weights respective to the base model instances in the subset. A number of base models represented in the subset is less than or equal to a number of all based models.

20 Claims, 8 Drawing Sheets

REAL TIME ENSEMBLE SCORING OPTIMIZATION

TECHNICAL FIELD

The present disclosure relates to predictive analytics, and more particularly to methods, computer program products, and systems for scoring by ensemble modeling and real time prediction performance optimization by priority.

BACKGROUND

In machine learning, supervised learning attempts to learn a mapping function, or a correlation, between inputs and outputs. While searching for the most accurate correlation, the supervised learning explores numerous hypotheses that makes predictions of the outputs based on the inputs, in a context of a particular problem. As in calculating the outputs based on prediction, for example, credit scores for individual financial trustworthiness, in order for the prediction to be reliably accurate, the inputs representing numerous factors are gathered from various sources and are heavily computed in predicting the outputs. An ensemble, referring to a set of models, by combining a number of selected models formulating respective hypothetical correlations, attempts to form a comprehensive correlation between the inputs and the outputs, and accordingly, to produce an accurate prediction that is improved from other predictions produced based on one model.

SUMMARY

The shortcomings of the prior art are overcome, and additional advantages are provided, through the provision, in one aspect, of a method. The method for optimizing real-time ensemble scoring includes, for instance: obtaining, by one or more processor, a request for a predicted score in real-time; forming, by the one or more processor, a subset of two or more base model instances in order of rank for a preconfigured priority policy, where a number of base models represented in the subset is less than or equal to a number of the two or more based models; and calculating, by the one or more processor, a fitness score of the formed subset as a sum of weights respective to the base model instances in the subset, wherein the fitness score quantifies the accuracy of the formed subset.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
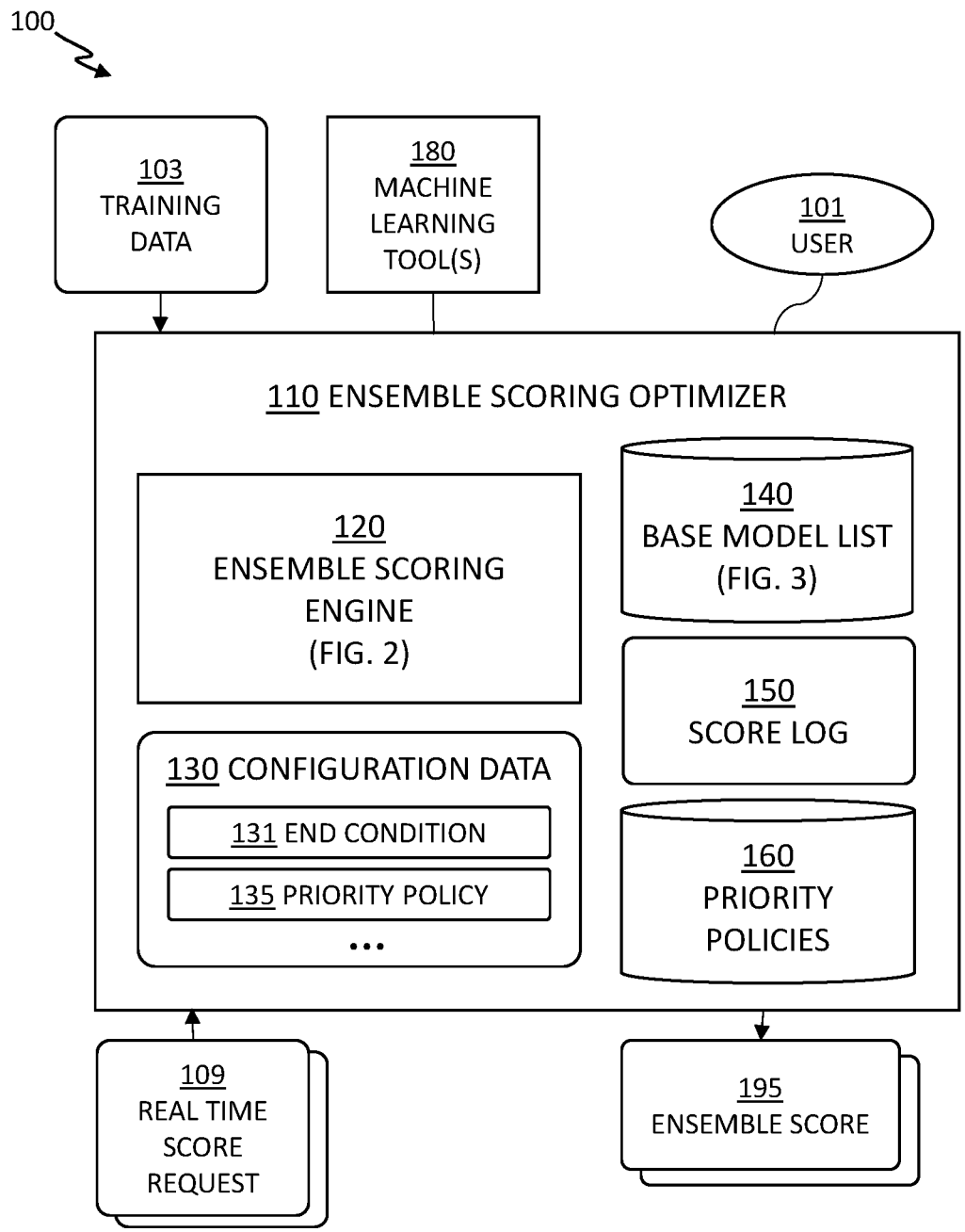
FIG. 1 depicts a system for optimized real-time ensemble scoring, in accordance with one or more embodiments set forth herein.

FIG. 1 depicts a system 100 for optimized real-time ensemble scoring, in accordance with one or more embodiments set forth herein.

Embodiments of the present invention recognize that an ensemble, indicating a plurality of models learnt from training data, are utilized for predicting an output from inputs, in the context of predictive analytics. Prediction by the ensemble, also referred to as ensemble scoring, is often used in financial sectors, such as anomaly detection in online transactions as occurring in real time, a loan approval screening based on various financial data.

Individual models in the ensemble respectively formulate a certain relationship between inputs and outputs in the training data. By combining the individual models formulating the respective relationships, the ensemble formulates the relationships represented in the training data more comprehensively than each individual model, and accordingly, predicts the output more accurately than an individual model in the ensemble. However, because the ensemble needs to run all models participating in the ensemble to produce a prediction, the ensemble scoring has a high demand on resources for computation and storage, respective to each model, as well as resources/mechanism for parallel processing, in order to reduce the time lapse from receiving a request until producing the prediction by concurrently processing all models in the ensemble.

Embodiments of the present invention also recognize that, a method of lazy evaluation, or call-by-need, in which an evaluation of an expression is delayed until a result of the evaluation is needed, is employed to avoid repeated evaluations, and accordingly, to improve efficiency with resource uses and to reduce error in the outcome. Accordingly, in the context of ensemble scoring, each model can only be evaluated when the ensemble selects the model as a member to the ensemble.

Each member model of an ensemble has respective processing delays, also referred to as a response time, as well as distinctive demands on computing resources and memory. As all member models of the ensemble need to complete evaluation for the ensemble to produce the prediction, the response time of the ensemble is bound by the lengthiest processing delay of all models. Embodiments of the present invention recognize that, conventionally an ensemble executes all member models available to produce a prediction, and that, accordingly, resource demands are high and the processing delay of the ensemble is equal to the longest response time amongst all member models, provided that all the models are processed concurrently. Embodiments of the present invention improve the processing delay and minimize the resource demands, by dynamically adjusting the member models of the ensemble based on a configured priority policy. Embodiments of the present invention further optimize throughput by taking characteristics of input data into account in selecting the member models.

The system 100 for optimization of real-time ensemble scoring includes training data 103, an ensemble scoring optimizer 110, and one or more real time score request 109. The training data 103 results from data mining or other case data applicable for modeling of base models.

A user 101 represents any human user, an administrator during modeling of the base models and/or while ensemble scoring for configuration adjustment, for providing inputs, and/or receiving outputs. The ensemble scoring optimizer 110 produces one or more predicted ensemble score 195, respective to each request of the real time score request 109. The ensemble scoring optimizer 110 is coupled to one or more machine learning tool 180.

The ensemble scoring optimizer 110 includes an ensemble scoring engine 120, configuration data 130, a base model list 140, a score log 150, and two or more priority policies 160.

The ensemble scoring engine 120 is a processing unit of the ensemble scoring optimizer 110. The configuration data 130 include an end condition 131 and a priority policy 135, which governs operations of the ensemble scoring engine 120. The end condition 131 is a threshold condition set for a score predicted based on a set of selected base models. An instance of a base model operates on input data to generate a score corresponding to the base model. By using the end condition 131, the ensemble scoring engine 120 determines if a prediction based on the set of selected base models is accurate enough for predicting an ensemble score, instead of running all the base models as in conventional ensemble scoring. The priority policy 135 is a performance factor used for selecting a set of base models, referred to as an ensemble, from the base model list 140. Detailed operations of the ensemble scoring engine 120 are presented in FIG. 2 and corresponding description.

Generally, the term "priority policy", or simply "policy", indicates a strategic mapping between a state and an action in the context of artificial intelligence (AI) problem solving, in which the state describes a problem at hand and the action indicates a best solution to the problem according to the purpose of the action. In this specification, the priority policy 135 identifies the performance factor that sets an order of access for the base models in the base model list 140. According to the respective ranks of the base models on the performance factor identified in the priority policy 135, the base models are ordered from the top of the base model list 140.

In certain embodiments of the present invention, the priority policy 135 is selected from the two or more priority policies 160, including Shortest Response, Greatest Throughput, Least CPU Usage, Least Memory Usage, and Least Resource Usage. In the Least Resource Usage priority policy, resource indicates both CPU and memory, and accordingly, the sum of CPU usage and memory usage is used to set the priorities. The ensemble scoring optimizer 110 includes a user interface and a corresponding interactive process by which the user 101 selects the priority policy 135 from available policy options as presented in the priority policies 160. Accordingly, the user 101 can select, by use of the user interface and the interactive process, one of the priority policies selected from the priority policies 160 in preparation of running the ensemble scoring engine 120, and set the selected priority policy as the priority policy 135 in the configuration data 130 for the ensemble scoring engine 120.

The ensemble scoring optimizer 110 calculates various configuration data 130 including a pass factor and a weight, respective to each base model, as well as performance metrics such as execution time, CPU usage, and memory usage of each base model.

In this specification, the term "weight" is used to indicate a rank of accuracy associated with a base model, amongst all base models represented in the base mode list 140. The ensemble scoring optimizer 110 calculates the ensemble score by adding up respective weights of selected base models.

In this specification, the term "pass factor" indicates a pass rate of respective base models upon certain input data, where the input data is a pass if the based model successfully generate a score meeting the end condition 131 based on input data, and the input data is a fail if the score does not meet the end condition 131. For example, if a base model X passes on eighty percent (80%) of input data from a sizeable sample larger than a threshold data size, then the pass factor of the base model X is regarded as 0.8. Because the score is an ensemble score generated by a plurality of selected base models, when the ensemble score does not meet the end condition 131, a process assessing the pass rate determines that a current input data had failed for all participating base models. The ensemble scoring optimizer 110 optionally adjusts the respective weights of the base models based on the pass factor corresponding to the base model.

The base model list 140 is an ordered list of two or more base models. Each base model has numerous identical instances because each instance of a base model is to be deployed for parallelly processing a plurality of real time score requests 109. The ensemble scoring engine 130 employs one instance of each selected base model for each thread of execution per request. Each thread uniquely identifies each instance by use of an array index or the like. Accordingly, the number of instances of each base model in the base model list 140 increases as the level of parallelism utilized by the ensemble scoring engine 120 increases.

As noted, base models in the base model list 140 are ordered according to the performance factor configured as the priority policy 135. Consequently, the ensemble scoring engine 120 first accesses the top priority base model in the base model list 140, and continues on to the next highest priority base model.

In certain embodiments of the present invention, the base model list 140 is implemented by use of a linked list, a stack, a queue, or a similar data structure in which respective instances of base models selected for the ensemble, or the subset, are ordered based on respective ranks of the base models on the performance factor configured as the priority policy 135. In this specification, although terms "ensemble" and "subset" are used interchangeably to indicate a collection of base models for prediction, the term "subset" is preferred to emphasize that the ensemble of the ensemble scoring engine 120 includes only some of the base models that are sufficient to produce a passing score that meets the end condition 131, in contrast to conventional ensemble scoring methods that include all candidate models.

In certain embodiments of the present invention, the ensemble scoring optimizer 110 generates base models of the base model list 140 according to the training data 103 and analyzes various performance metrics of the base models by use of the one or more machine learning tool 180. In other embodiments of the present invention, the ensemble scoring optimizer 110 includes a separate modeling process for the base models, and a separate performance evaluation process for analyzing performance metrics of the base models.

The ensemble scoring engine 120 records a score calculated for the real time score request 109 in the score log 150, as being associated with a current subset of base model instances from the base model list 140 and the priority policy 135 as applied. In certain embodiments of the present invention, a separate process handling the score log 150 can be present. The score log 150 includes all intermediate scoring components and corresponding values during the process of the ensemble scoring engine 120, until producing the predicted ensemble score 195. Examples of the score log 150 in use cases are presented in FIGS. 4 and 5, and respectively corresponding descriptions.

Figure 2:
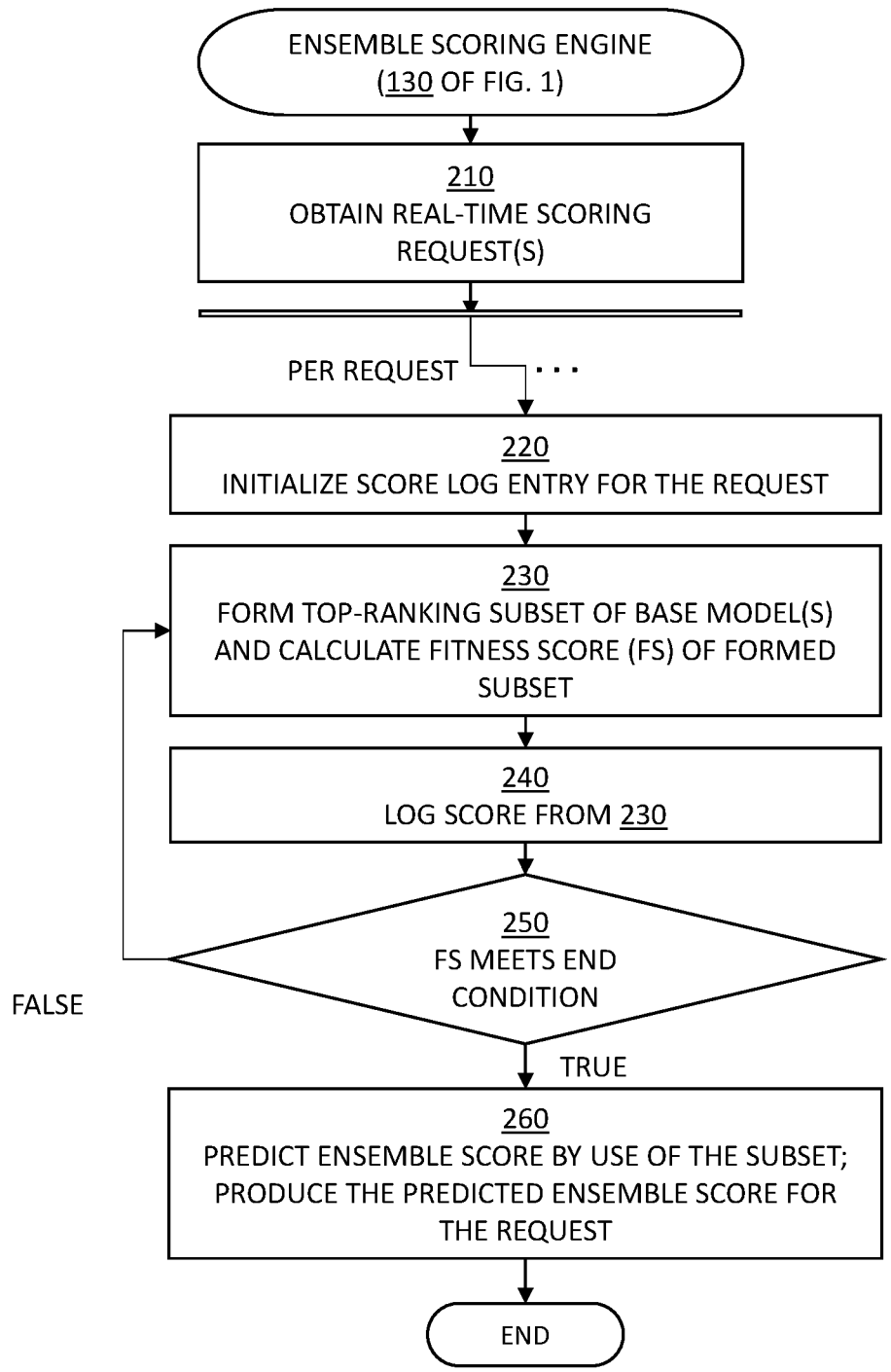
FIG. 2 depicts a flowchart of operations performed by the ensemble scoring engine, in accordance with one or more embodiments set forth herein.

FIG. 2 depicts a flowchart of operations performed by the ensemble scoring engine 120, in accordance with one or more embodiments set forth herein.

As ensemble scoring employs scores corresponding to more than one model, conventional ensemble scoring requires more computing and storage resources than scoring based on single model, in exchange of enhanced accuracy from single model scoring. The ensemble scoring engine 120 optimizes response time and resource demands of conventional ensemble scoring by employing some of the base models in calculating the prediction, unlike conventional ensemble scoring which utilizes all base models. As noted, respective instances of base models are ordered, in the base model list 140, according to respective ranks of the base models on a specific performance factor configured as the priority policy 135. The ensemble scoring engine 120 selects a subset of prioritized base model instances from the base mode list 140 that are enough to produce a passing score that meets the end condition 131, resulting in spending less idle time pending completion of other base models in an ensemble with longer response times. Accordingly, the ensemble scoring engine 120 improves overall efficiency in resource usage and response time of conventional ensemble scoring, without compromising accuracy of resulting prediction.

Prior to block 210, the priority policy 135 is automatically selected or interactively set by the user 101, from the priority policies 160. Also prior to block 210, subsequent to the priority policy 135 is set, base models are ordered, in the base model list 140, according to respective values of a performance factor configured for the priority policy 135. When the priority policy 135 has been changed, a process responsible for the base model list 140 can modify the order of access for the base models such that the highest priority base model is to be accessed first, but no change is necessary for the instances of the base models.

In block 210, the ensemble scoring engine 120 obtains one or more real-time scoring request. Examples of the real-time scoring request can include, but are not limited to, anomaly detection in online transactions, a loan approval screening, a credit score calculation, or the like in the areas where the prediction can be produced only with numerous data sources and extensive computation. Then the ensemble scoring engine 120 proceeds with block 220.

Blocks 220 through 260 are concurrently performed as a unit for each real-time scoring request received in block 210.

In block 220, the ensemble scoring engine 120 initializes an entry in the score log 150, referred to as the score log entry, corresponding to a current request amongst the one or more real-time scoring request obtained from block 210. Then the ensemble scoring engine 120 proceeds with block 230.

In one embodiment of the present invention, the score log entry corresponding to the current request includes a plurality of subset score records. Each subset score record includes a subset index, a subset definition identifying each base model selected for the subset, respective model scores corresponding to each base model listed in the subset definition, and a fitness score corresponding to the subset index. The subset score record also has a difference set, which is used when the ensemble scoring engine 130 adjusts one subset to another subset in block 230.

In block 230, the ensemble scoring engine 120 forms a top-ranking subset by including N number of base models from the top of the base model list 140, and then calculates a score corresponding to the formed subset.

In one embodiment of the present invention, the ensemble scoring engine 120 dynamically computes the size of the subset, or the subset size N, by adding up the respective weights of the base models from the top ranking base model, assuming that the selected base model will produce a passing result based on the input data. A fitness score (FS) corresponding to the subset having N base models, is equal to the sum of weights for respective base models included in the subset, noted as $weight_i$, where each base model is indexed i, $1 \leq i \leq N$, $$\text{Fitness Score (subset)} = \sum_{i=1}^{N} weight_i$$

As noted, the base model list 140 is ordered according to the rank of the priority performance factor. The ensemble scoring engine 120 orderly accesses the base model list 140 from the top of the base mode list 140, to ensure to access the highest ranking base model first. When the value of FS satisfies the end condition 131, then the ensemble scoring engine 120 determines that the number of base models in the subset size (N) is sufficient to calculate the ensemble score and proceeds with calculating the score. The fitness score FS represents an estimate of the score for the subset, prior to calculating the base models with the input data, presuming that all base models participating in the subset produce respective passing results.

Subsequent to forming the subset, the ensemble scoring engine 120 calculates a score corresponding to the formed subset by adding a product of weight of the base model and a binary pass/fail score for the i-th base model, noted as $pass_i$, $$\text{Score (subset)} = \sum_{i=1}^{N} (pass_i \times weight_i),$$

where $pass_i=1$ if the i-th base model produces a passing result based on the input data in the real time score request 109, and $pass_i=0$ if the i-th base model fails to produce a passing result based on the input data in the real time score request 109. Then the ensemble scoring engine 120 proceeds with block 240.

In case where the subset previously formed in the latest run of block 230 failed to produce an ensemble score meeting the end condition 131, referred to as a passing score, then the ensemble scoring engine 120 can perform block 230 for another round subsequent to block 250. In such cases, the ensemble scoring engine 120 specifies a difference set identifying which base model should be calculated as a corresponding model score is not available. If the ensemble scoring engine 120 discovers that all model scores corresponding to base models in a newly formed subset are available, then the ensemble scoring engine 120 simply uses the available model scores that had been previously calculated.

In certain embodiments of the present invention, the ensemble scoring optimizer 110 can heuristically configure various aspects of subset selection during preparing the base model list 140, including, but not limited to, a tie breaker, or what to do when more than one base model is ranked the same. For example, when Response Time is the priority performance factor, the ensemble scoring engine 120 can examine respective weights of two base models having the same Response Time value, to determine the order amongst the two base models in the base model list 140. Examples of subset selection elements respective to two (2) types of weight implementation are presented in FIGS. 4 and 5, and respectively corresponding description.

In certain embodiments of the present invention, each base model included in the subset runs independently from each other and calculates respective base model scores, such that another level of parallelism in calculating the score for the subset can be achieved.

In block 240, the ensemble scoring engine 120 logs the score from block 230 to the score log entry initialized in block 220. The ensemble scoring engine 120 stores a subset score record corresponding to the subset formed from block 230, including respective values for the subset index, the subset definition identifying each selected base model, respective model scores corresponding to each base model from the subset definition, and a fitness score corresponding to the subset index. Then the ensemble scoring engine 120 proceeds with block 250.

In order to optimize efficiency with the base model instance utilization, the ensemble scoring engine 120 fetches, in block 230, selected instances of the base model from the base model list 140, and returns back to the base model list 140 upon recording the score log entry in block 240. The instance of the base model can be made available for other thread to calculate other input data, once returned back to the base model list 140.

As noted, in case where the subset previously formed in the latest run of block 230 failed to produce a passing score, then the ensemble scoring engine 120 performs block 230 for another round subsequent to block 250, and specifies the difference set. The ensemble scoring engine 120 records any difference set, and corresponding model scores, which had been specified in the same round of block 230, in the subset score record of the score log entry.

In block 250, the ensemble scoring engine 120 checks if the score of the subset calculated block 230 satisfies the end condition 131. If the ensemble scoring engine 120 determines that the score of the subset calculated in block 230 does not satisfy the end condition 131, then the ensemble scoring engine 120 loops back to block 230. If the ensemble scoring engine 120 determines that the score calculated in block 230 satisfies the end condition 131, then the ensemble scoring engine 120 proceeds with block 260.

In block 260, the ensemble scoring engine 120 produces the score of the subset as the predicted ensemble score 195 for the current real time score request 109, because the score of the subset had been determined as satisfying the end condition 131 from block 250. Then the ensemble scoring engine 120 terminates processing the current request.

Figure 3:
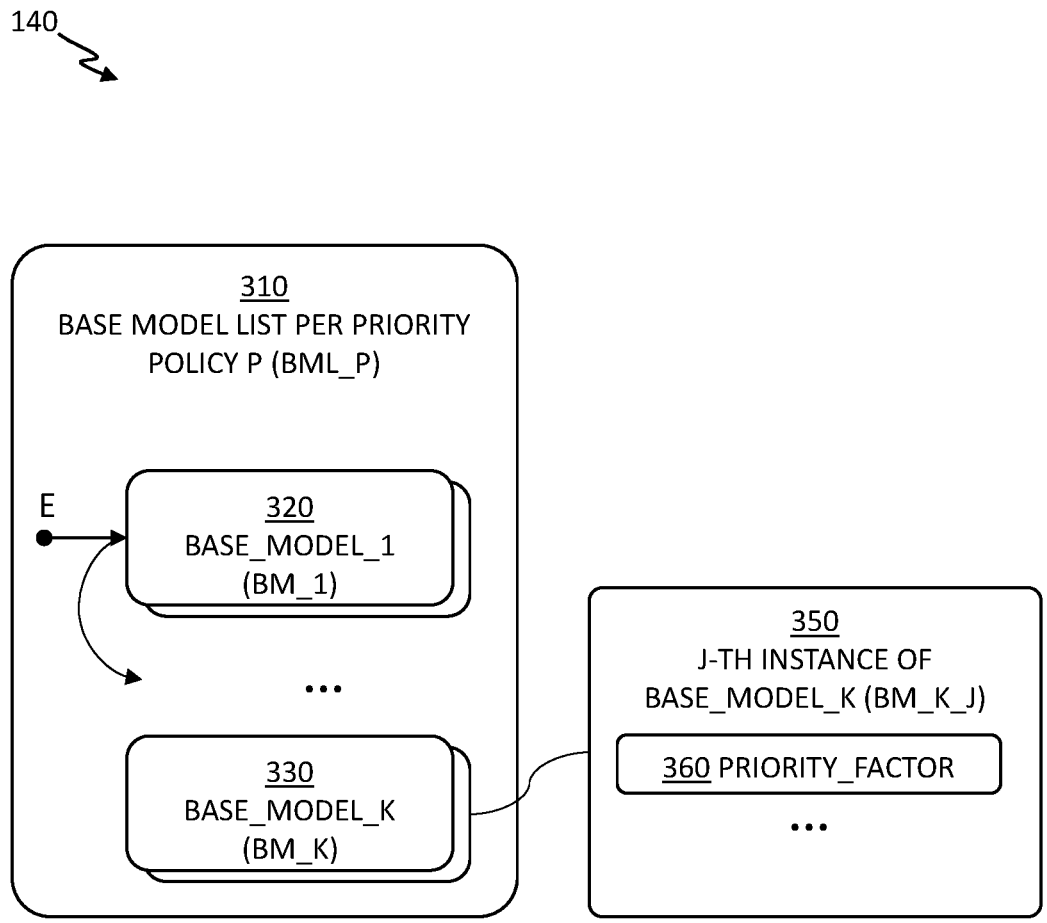
FIG. 3 depicts details of the base model list, in accordance with one or more embodiments set forth herein.

FIG. 3 depicts details of the base model list 140 of FIG. 1, in accordance with one or more embodiments set forth herein.

The exemplary base model list BML_P 310 is prioritized for a performance factor P as configured in the priority policy. The BML_P 310 is one implementation of the base model list 140 of FIG. 1. The BML_P 310 is a linked list of base models 320, 330, which are ordered according to respective values in a priority factor 360 of the base models 320, 330. The priority factor 360 indicates a performance factor P prioritizing the orders of the base models 320, 330 in the base model list BML_P 310.

The BML_P 310 includes k number of base models including a first base model, BM_1 320 and a k-th base model, BM_K 330, where k is an integer greater than or equal to two (2). Each base model has a plurality of identical base model instances that can run for each of parallelly processed real time score requests 109.

As shown in a j-th instance of the BM_K_J 350, each instance of all base models has one or more priority factor 360, which stores a priority value of the base model corresponding to the priority factor 360. All instances of the k-th base model BM_K 330 have the same value for the priority factor 360.

Because the base models 320, 330 within the BML_P 310 are ordered according to the configured priority policy P, the BML_P 310 herein shows that the first base model BM_1 320 is ranked higher than the k-th base model BM_K 330, according to respective values for the priority factor 360, which is a prioritized performance factor corresponding to the priority policy P.

Arrow E shows a subset of base models in the BML_P 310, used as an ensemble of the ensemble scoring engine 120. The subset E includes the first base model BM_1 320, and because the first base model BM_1 320 is the top-ranked base model with respect to the priority P, a link representing the subset E begins at the first base model BM_1 320. Lower ranking base models are subsequently linked from the previous base model, in order of the rank in terms of the priority policy P. The ensemble scoring engine 120 accesses the top-ranking subset so constructed, such that the ensemble scoring engine 120 can produce a prediction with the least number of base models, improving throughput of partial ensemble scoring.

Respective sizes of subsets, indicating the number of base models in the subsets, are evaluated by analyzing base model weights and input data characteristic according to the priority policy P, and is dynamically adjusted based on certain real-time factors such as system status of a current running platform. As noted, the ensemble scoring engine 120 can dynamically calculate the subset size with respect to the end condition 131. For example, where the priority policy P is set for the shortest response time, then a process preparing the BML_P 310 can order the base models 320, 330, from the base model having the shortest response time to another base model having a next shortest response time, and so on. If a plurality of base models share the same response time, then a base model having the largest weight can be ordered first within the BML_P 310.

Figure 4:
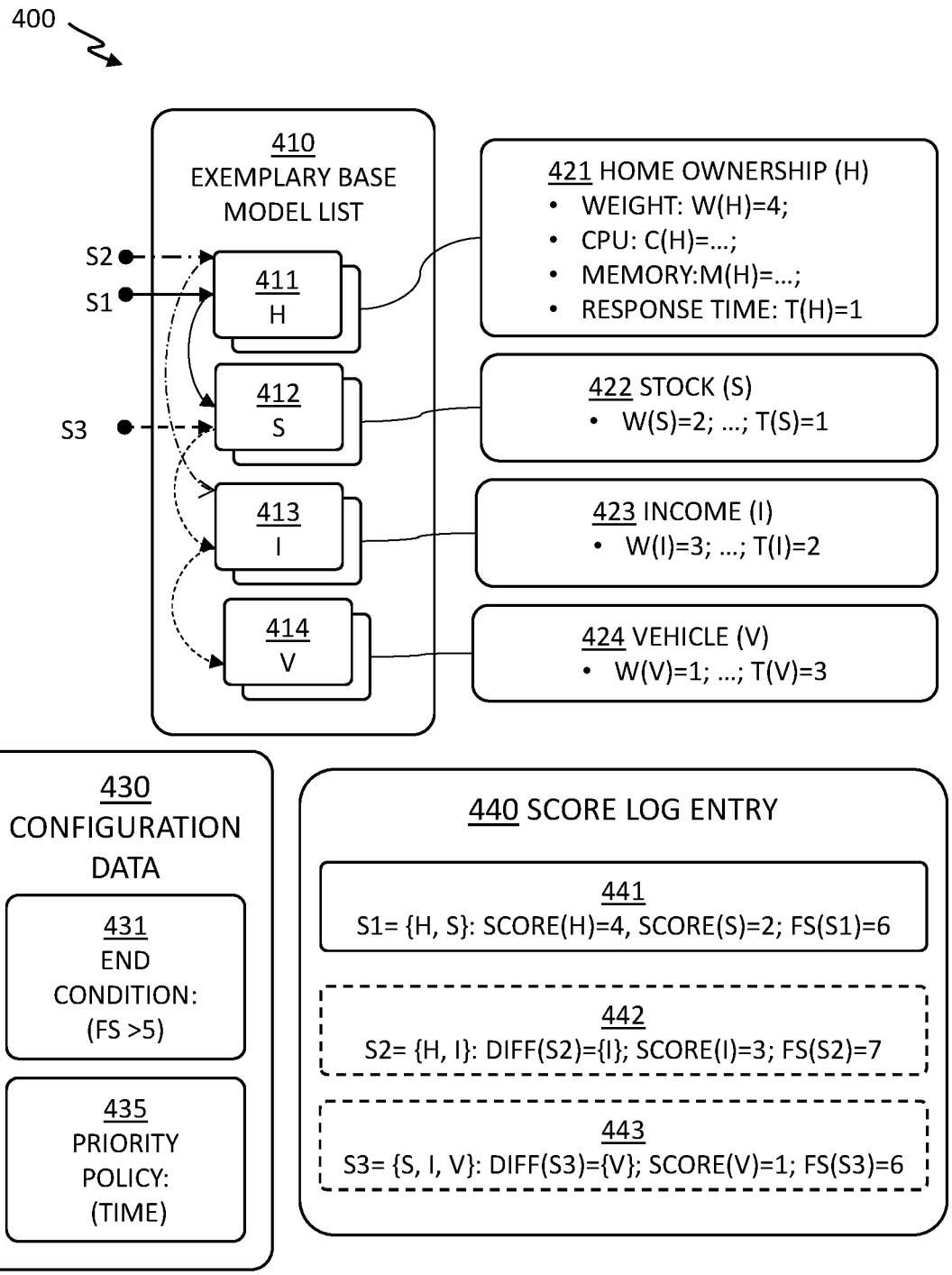
FIG. 4 depicts an exemplary memory snapshot for the ensemble scoring engine, in accordance with one or more embodiments set forth herein.
Figure 5:
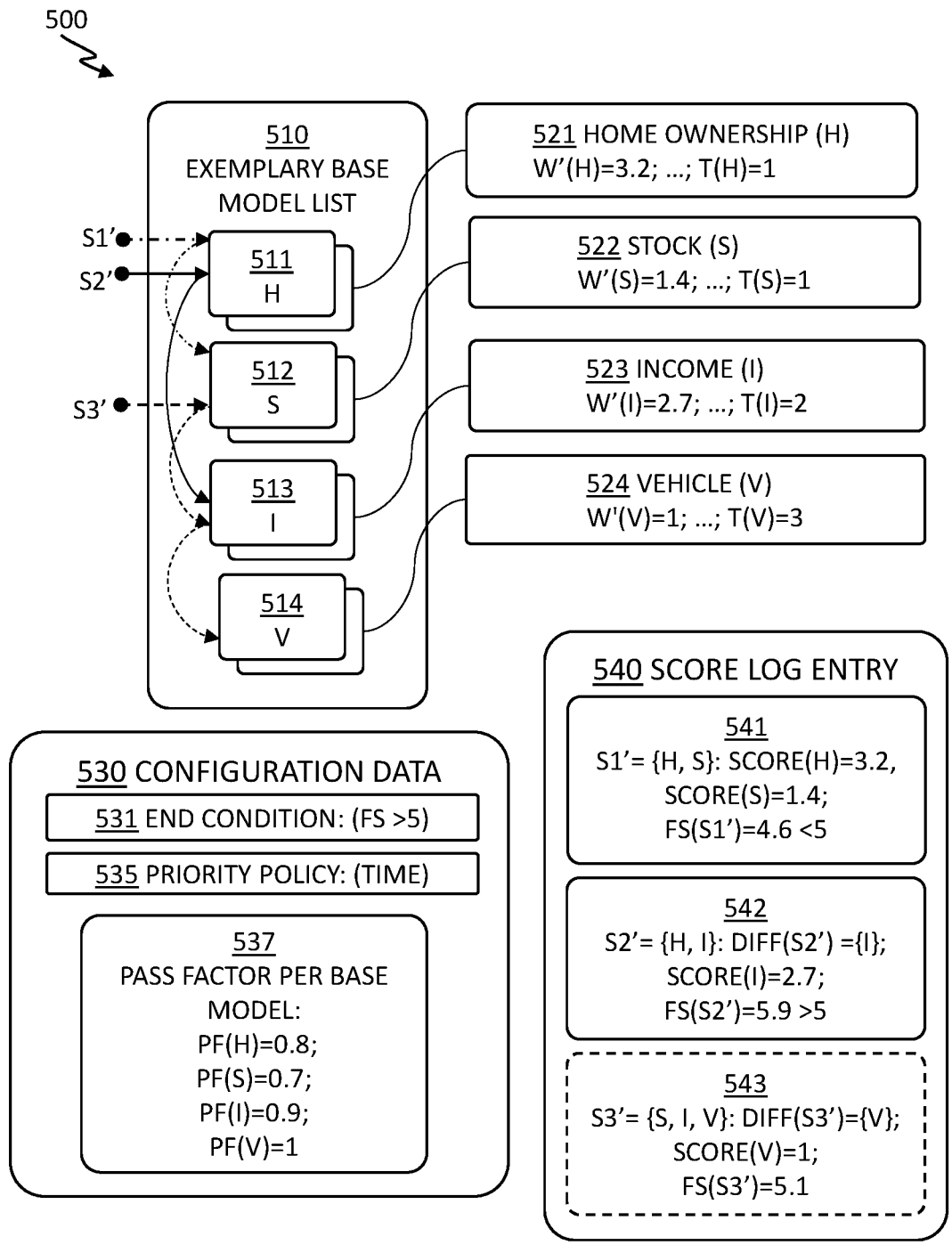
FIG. 5 depicts another exemplary memory snapshot for the ensemble scoring engine, in accordance with one or more embodiments set forth herein.

Examples of subsets and representation thereof, according to distinctive weight implementation schemes, are presented in FIGS. 4 and 5, and respectively corresponding descriptions.

FIG. 4 depicts an exemplary memory snapshot 400 for the ensemble scoring engine 120, in accordance with one or more embodiments set forth herein.

In the exemplary memory snapshot 400 in calculating a loan approval score, the exemplary base model list 400 includes instances of four (4) base models, which are a home ownership model (H) 411, 421, a stock model (S) 412, 422, an income model (I) 413, 423, and a vehicle model (V) 414, 424. Each base model (bm) includes a corresponding weight, W(bm), and three (3) priority factors including CPU usage, C(bm), memory usage, M(bm), and response time, T(bm). Respective models can be prepared to calculate input data in order to produce a model score, according to respective threshold conditions. For example, a home ownership, property value and location of the home, and/or the monthly expense on home including mortgage, rent, and maintenance for the home ownership model H 411, 421, a certain portfolio size and composition in stock possession for an individual for the stock model S 412, 422, a certain range of annual, pre-tax or disposable income for the income model I 413, 423, and an ownership of a vehicle, a type and grade of a vehicle, and/or certain scale for monthly expenses on vehicle for the vehicle model V 414, 424. Each instance of one base model is identical to other instance of the same base model, which is utilized for calculating a model score, also referred to as a member score, and produces the same result if provided with the same input data. As noted, multiple instances of the same base model are present to support the level of parallelism required for the ensemble scoring engine 120.

The weight indicates how accurate an indicator of the respective base models are in predicting the loan approval score. In the embodiment of FIG. 4, the weight is a rank in accuracy of each model, which is represented in distinctive integers, resulting in the most accurate model amongst the four models has the greatest value. The home ownership model H 411, 421 is determined to be the most accurate indicator for calculating the loan approval score, and is ranked highest amongst four (4) base models, and accordingly, the home ownership model H 411, 421 has a weight value of four (4). The second highest ranking base model is the income model I 413, 423, with a weight value of three (3), the third highest ranking base model is the stock model S 412, 422, having a weight value of two (2). The least significant indicator for the loan approval score is the vehicle model V 414, 424, having a weight value of one (1).

In the same embodiment, the priority factors of CPU, memory, and response time are presented in relative quantities of the respective resources used to run the respective base models, and accordingly, the lower numbers in the CPU, memory, and the response time priority factors are preferred, and accordingly, the higher priority.

According to the end condition "ES>5" 431 in the configuration data 430, indicating that the ensemble score (ES) to be greater than five (5), the ensembles scoring engine 120 forms and uses a subset of which fitness score (FS) is greater than five (5) to calculate the score. Also the ensemble scoring engine 120 produces only the calculated score that meets the end condition 431 as the predicted ensemble score 195. The fitness score of a subset, as dynamically calculated while forming a top-ranking subset in block 230, collectively indicates the accuracy of the subset, as a sum of model weights presuming that the participating models will produce respectively passing results.

According to the priority policy 435, set for "TIME", of the configuration data 430, the exemplary base mode list 410 has the base models ordered from the shortest response time first. All instances of the home ownership model H 411, 421 have identical values in weight, W(H)=4, and response time, T(H)=1; and all instances of the stock model S 412, 422 have identical values in weight, W(S)=2, and response time, T(S)=1. Although both the home ownership model H 411, 421 and the stock model S 412, 422 have the same response time, T(H)=T(S), the home ownership model H 411, 421 is on top of the exemplary base model list 410, in front of the stock model S 412, 422, because the weight is used as a tie breaker in ordering the base models. As noted, for the response time performance factor, the smaller value has the higher priority, and for the weight, the greater value has the higher priority. The income model I 413, 423 is ordered next to the stock model 412, 422, with the next shortest response time, T(I)=2, then the vehicle model V 414, 424 follows with the longest response time, T(V)=3.

When a score request is obtained in block 210 of FIG. 2, the ensemble scoring engine 120 initializes a score log entry 440 for the score request in block 220. Upon performing block 230 of FIG. 2, the ensemble scoring engine 120 accesses the exemplary base model list 410 and forms a first subset S1 by including respective instances of two (2) top ranking base models, H 411 and S 412, as shown in a first subset score record 441 corresponding to S1={H, S} in the score log entry 440. The size of the first subset S1 is determined as the least fitness score of the first subset S1 that meets the end condition 431, that is FS(S1)>5, where the FS(S1) is the sum of weights of the home ownership model H 411, 421 and the stock model S 421, 422, $$FS(S1)=W(H)+W(S)=4+2=6$$

Then, also in block 230, the ensemble scoring engine 120 calculates respective model score for the home ownership model instance H 411, 421, score(H)=W(H)×pass(H)=4×1, and the stock model instance S 412, 422, score(S)=W(S)×pass(S)=2×1, presuming that the input data generated passing result for both base models. Accordingly, $$S(S1)=4\times1+2\times1=6$$

The ensemble scoring engine 120 stores all calculated results in the subset score record for the first subset S1 in block 240, as shown in the first subset score record 441.

Upon performing block 250, the ensemble scoring engine 120 discovers that the score for the first subset meets the end condition, S(S1)=6>5, and proceeds with block 260 to produce the score of the first subset S(S1) as the predicted ensemble score 195.

Had the first subset S1 failed to generate a score greater than five (5), that is S(S1)≤5, then the ensemble scoring engine 120 loops back to block 230 and forms a second subset S2. The second subset S2 is marked with a couple of dot-dash arrows in the exemplary base model list 410.

Even when the fitness score of the first subset, FS(S1), meets the end condition 431, upon calculating the respective base models based on the input data, if either one of the model fails to generate a passing result, then the weight corresponding to the failed model would not be added to the S(S1), and accordingly, S(S1) cannot meet the end condition. Either a second subset S2 or a third subset S3 is formed and calculated only when the first subset S1 fails to meet the end condition 431 in the first run of block 250, depending on which member model of the first subset had failed.

In case where the first subset S1 failed in block 250 because the stock model S 412, 422 had failed, then the score of the first subset is equal to the score of the home ownership model H 411, 421, that is, $$S(S1)=4\times1+2\times0=4$$

In a subsequent run of block 230, the ensemble scoring engine 120 keeps the home ownership model H 411, 421, and selects the next highest ranking model, the income model I 413, 423 in place of the stock model S 412, 422, for the second subset S1, resulting in S2={H, I}, as shown in a second subset score record 442 of the score log entry 440. A dashed boundary of the second subset score record 442 indicates that the second subset score record 442 is stored depending on the result of the first subset S1.

In comparison to the first subset S1, the second subset S2={H, I} differs only with the income model I 413, 423, and accordingly, the ensemble scoring engine 120 sets a difference set for the second subset specifying the income model I 413, 423, denoted as Diff (S2)={I}. The fitness score for the second subset FS(S2) is $$FS(S2)=W(H)+W(I)=4+3=7$$

indicating the second subset S2 is more accurate than the first subset S1.

The base model score for the income model I 413, 423 is calculated according to the formula for base model score above, resulting in score(I)=W(I)×pass(I)=3, and the score for the second subset S2 is calculated as $$S(S2)=4\times1+3\times1=7$$

which is a passing score satisfying the end condition 431, which can be produces as the ensemble score 195 in block 260.

In case where the first subset S1 failed in block 250 because the home ownership model H 411, 421 had failed, then the score of the first subset is equal to the score of the stock model S 412, 422 that is, $$S(S1)=4\times0+2\times1=2$$

In a subsequent run of block 230, the ensemble scoring engine 120 keeps the stock model S 412, 422, and selects, for the third subset S3 in place of the failed home ownership model H 411, 421, next highest ranking models, the income model I 413, 423, and the vehicle model V 414, 424, until the fitness score of the third subset S3 meets the end condition 431, resulting in S3={S, I, V}, as shown in a third subset score record 443 of the score log entry 440. A dashed boundary of the third subset score record 443 indicates that the third subset score record 443 is stored depending on the result of the first subset S1.

In comparison to the first subset S1, the third subset 53={S, I, V} differs with the income model I 413, 423, and the vehicle model V 414, 424. Accordingly, the ensemble scoring engine 120 sets a difference set for the third subset S3 specifying the income model I 413, 423, and the vehicle model V 414, 424, denoted as Diff (S3)={I, V}. The fitness score for the third subset FS(S3) is $$FS(S3)=W(S)+W(I)+W(V)=2+3+1=6$$

indicating the third subset S3 is as accurate as the first subset S1.

The base model scores for the income model I 413, 423 and the vehicle model V 414, 424, from Diff(S3) are calculated according to the formula for base model score above, resulting in score(I)=W(I)×pass(I)=3, and score(V)=W(V)×pass(V)=1. Consequently, the score for the third subset S3 is calculated as $$S(S3)=2\times1+3\times1+1\times1=6$$

which is a passing score satisfying the end condition 431, which can be produces as the ensemble score 195 in block 260.

The predicted ensemble score 195 can either approve or deny the loan application, depending on the values financial data of the loan applicant as being input to the ensemble scoring engine 120.

As a reference, an ensemble, denoted as e, including all four (4) base models has a fitness score of ten (10), and generates a score $$S(e) = \text{score}(H) + \text{score}(S) + \text{score}(I) + \text{score}(V) =$$
$$4\times1+2\times1+3\times1+1\times1=10$$

in three (3) units of response time, the longest of all response times corresponding to each base model, while the first subset S1 can generate a passing score of six (6) in one (1) unit of response time. By calculating only the subset of the ensemble having only some of the base models orderly selected from a prioritized list, the ensemble scoring engine 120 can predict a reasonably reliable ensemble score that meets the end condition 431 earlier and with less resource than conventional ensemble scoring.

FIG. 5 depicts another exemplary memory snapshot 500 for the ensemble scoring engine 120, in accordance with one or more embodiments set forth herein.

In the embodiment of FIG. 4, the prediction of the ensemble score can be delayed in cases where the fitness score predicted from the subset of the base models does not represent the calculated score of the subset, wherein the ensemble scoring engine 120 should form another subset by selecting one or more next highest ranking base model from the base model list 140, as shown in the second subset S2 and the third subset S3 of FIG. 4.

In order to prevent repeated calculation and to improve early efficiency for most of input data, a pass factor 537 for each base model indicating a pass rate of each base model on certain input data, that is, how likely certain input data is to pass the base model, is introduced for subset selection.

In FIG. 5, the exemplary base model list 510, and multiple instances of four (4) base models are presented similarly to respectively corresponding elements of FIG. 4. However, according to the pass factors respective to base models 537 of configuration data 530, the respective weights of the four (4) base models are adjusted to a respective product of the weight of the base model and the pass factor of the base model, for calculating a fitness score for a subset, $$FS(S) = \sum_{i=1}^{N} W'(BM_i) = \sum_{i=1}^{N} W(BM_i) \times PF(BM_i),$$

where W'(bm) indicates an adjusted weight of a base model bm according to the pass factor value for the base model bm, denoted as PF(bm).

Accordingly, for the purpose of calculating the fitness score for a top-ranking subset, the adjusted weights for the home ownership model H 511, 521, the stock model (S) 512, 522, the income model (I) 513, 523, and the vehicle model (V) 514, 524 are as below, respectively.

$$W'(H)=W(H)\times PF(H)=4\times0.8=3.2;$$

$$W'(S)=W(S)\times PF(S)=2\times0.7=1.4;$$

$$W'(I)=W(I)\times PF(I)=3\times0.9=2.7; \text{ and}$$

$$W'(V)=W(V)\times PF(V)=1\times1=1$$

When a score request is obtained in block 210 of FIG. 2, the ensemble scoring engine 120 initializes a score log entry 540 for the score request in block 220. Upon performing block 230 of FIG. 2, the ensemble scoring engine 120 accesses the exemplary base model list 510 and forms a first subset S1' by including respective instances of two (2) top ranking base models, H 511 and S 512, as in FIG. 4, but the fitness score of the S1' is equal to 4.6, that is, FS(S1')=W'(H)+W'(S)=3.2+1.4=4.6, which does not meet the end condition 531, as being less than five (5). The first subset score record 541 of FIG. 5 is not calculated as the fitness score of the first subset S1' based on the adjusted weights does not meet the end condition 531. The first subset score record 541 of FIG. 5 is shown in a dashed boundary, to indicate that the ensemble scoring engine 120 does not create the first subset score record 541 in the score log entry 540, but only as a reference in comparison with the first subset score record 441 of FIG. 4.

The ensemble scoring engine 120, then, proceeds with forming the second subset S2', by adding, to the first subset S1', the income base model I 513, 523, which is ordered next to the stock base model S 512, 522, in the exemplary base model list 510.

The fitness score of the second subset S2' based on the adjusted weights of respective base models H, S, and I, meets the end condition 531, as FS(S2')=W'(H)+W'(S)+W'(I)=3.2+1.4+2.7=7.3>5.

When the ensemble scoring engine 120 calculates the respective score of the base models, and discovers that, although the home ownership base model H 511, 521, and the income base model 513, 523, had passed in provided input, the stock model S, 512, 522, had not passed with the same provided input, resulting in:

$$S(S2') = score(H) + score(S) + score(I) = 4 \times 1 + 2 \times 0 + 3 \times 1 = 7$$

The ensemble scoring engine 120 then, stores the score of the second subset S2'={H, S, I}, and respective base mode scores as shown in the second subset score record 542.

In the present example, the pass factor of the stock base model, PF(S)=0.7, was the lowest amongst all base models in the pass factor 537 of the configuration data 530. The lowest pass factor indicates that the stock base model is the least likely to pass based on certain input. Had the fitness score not been adjusted based on the pass factors respective to the base models, as in the example of FIG. 4, the ensemble scoring engine 120 would have calculated a score for the first subset S1', and the score for the first subset S1' would have been calculated as:

$$S(S1') = score(H) + score(S) = 4 \times 1 + 2 \times 0 = 4,$$

which does not meet the end condition 531 as being less than five (5). The ensemble scoring engine 120 then, loops back to block 230 of FIG. 2, to form the second subset S2', which would finally produce a passing score of seven (7) that meets the end condition 531. In the example of FIG. 5, by adjusting the weight based on the pass factors of the respective base models, the ensemble scoring engine 120 produces the same passing score of seven (7) by initially forming the second subset S2' without wasting time and resources to calculate the score of the first subset S1', which improves resource utilization and throughput of the score prediction.

Certain embodiments of the present invention can offer various technical computing advantages, including improving response time and resource utilization by partial ensemble scoring with an end condition to assure a certain level of accuracy in a predicted score. Certain embodiments of the present invention offers a list of base models ordered according to a certain performance factor configured in the priority policy, in order to improve processing efficiency in forming a subset for ensemble score prediction. By ordering the base models in the list, embodiments of the present invention can further improve efficiency in prediction by eliminating delays caused by selecting base models for a subset that cannot generate a passing score for accuracy. Certain embodiments of the present invention also employs a pass factor respective to each base model, in order to minimize the delays caused by running more than one subset of the base models. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription. The onboarding automation and performance optimization service can be provided for subscribed business entities in need from any location in the world.

Figure 6:
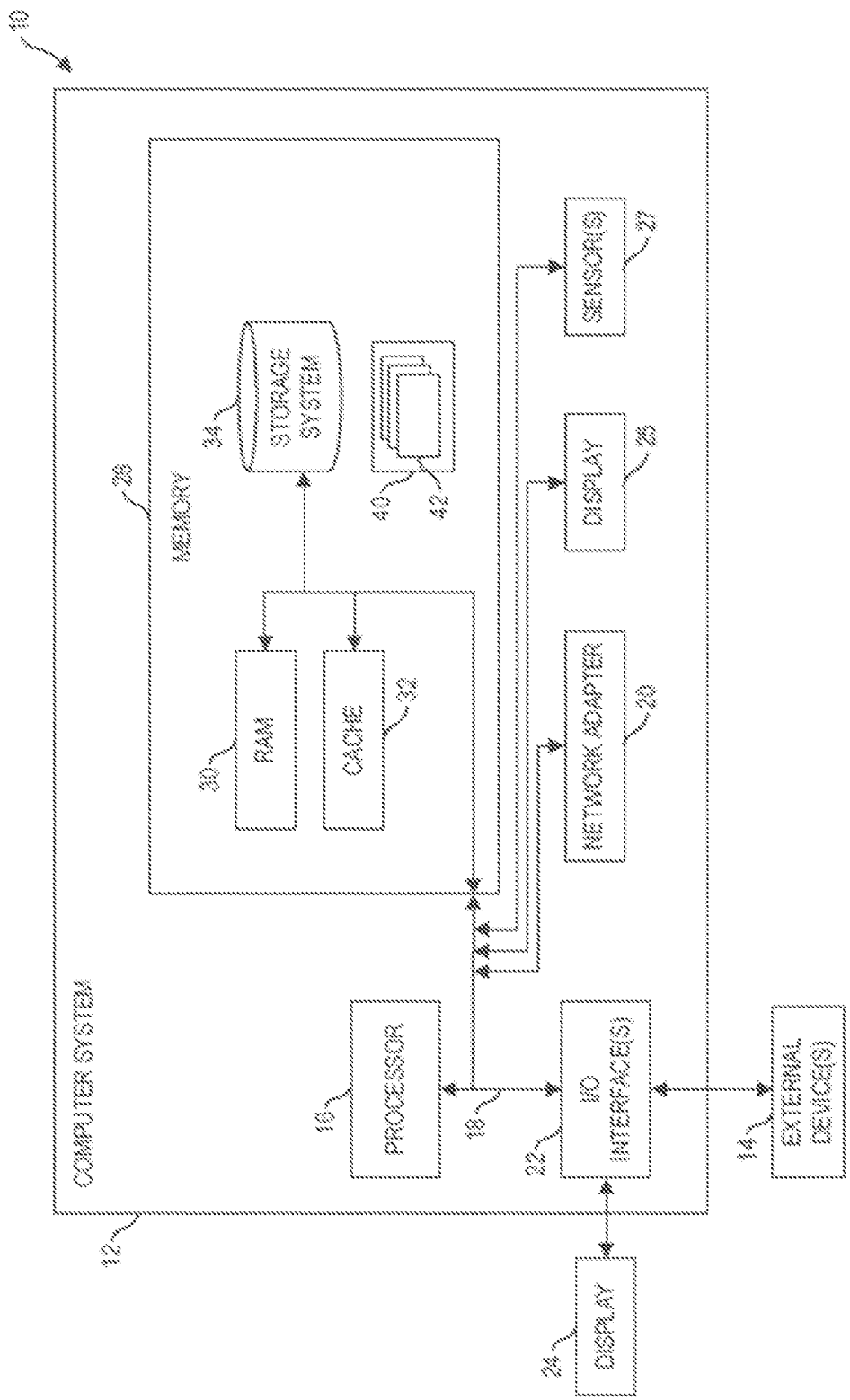
FIG. 6 depicts a cloud computing node according to an embodiment of the present invention.
Figure 7:
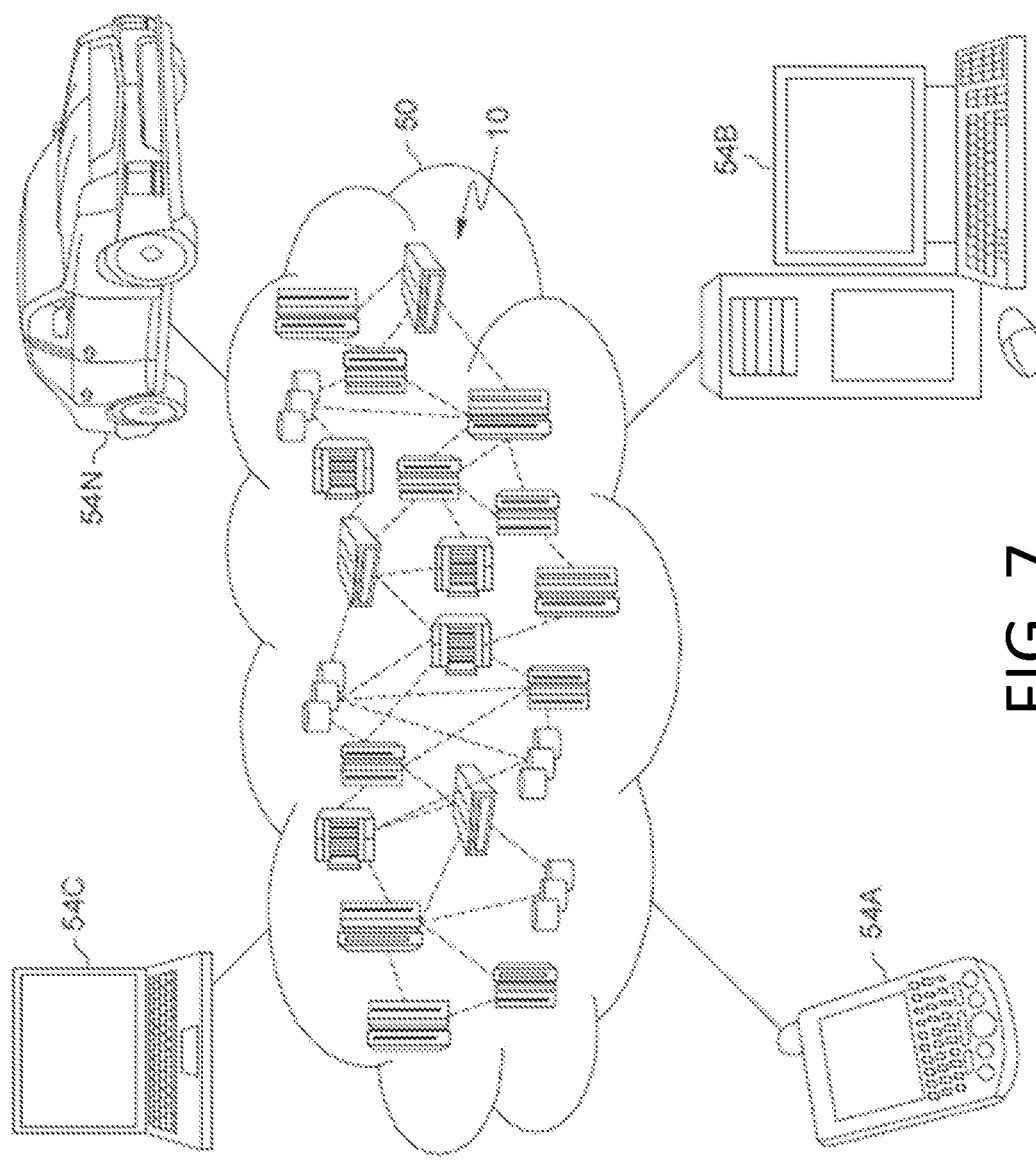
FIG. 7 depicts a cloud computing environment according to an embodiment of the present invention.
Figure 8:
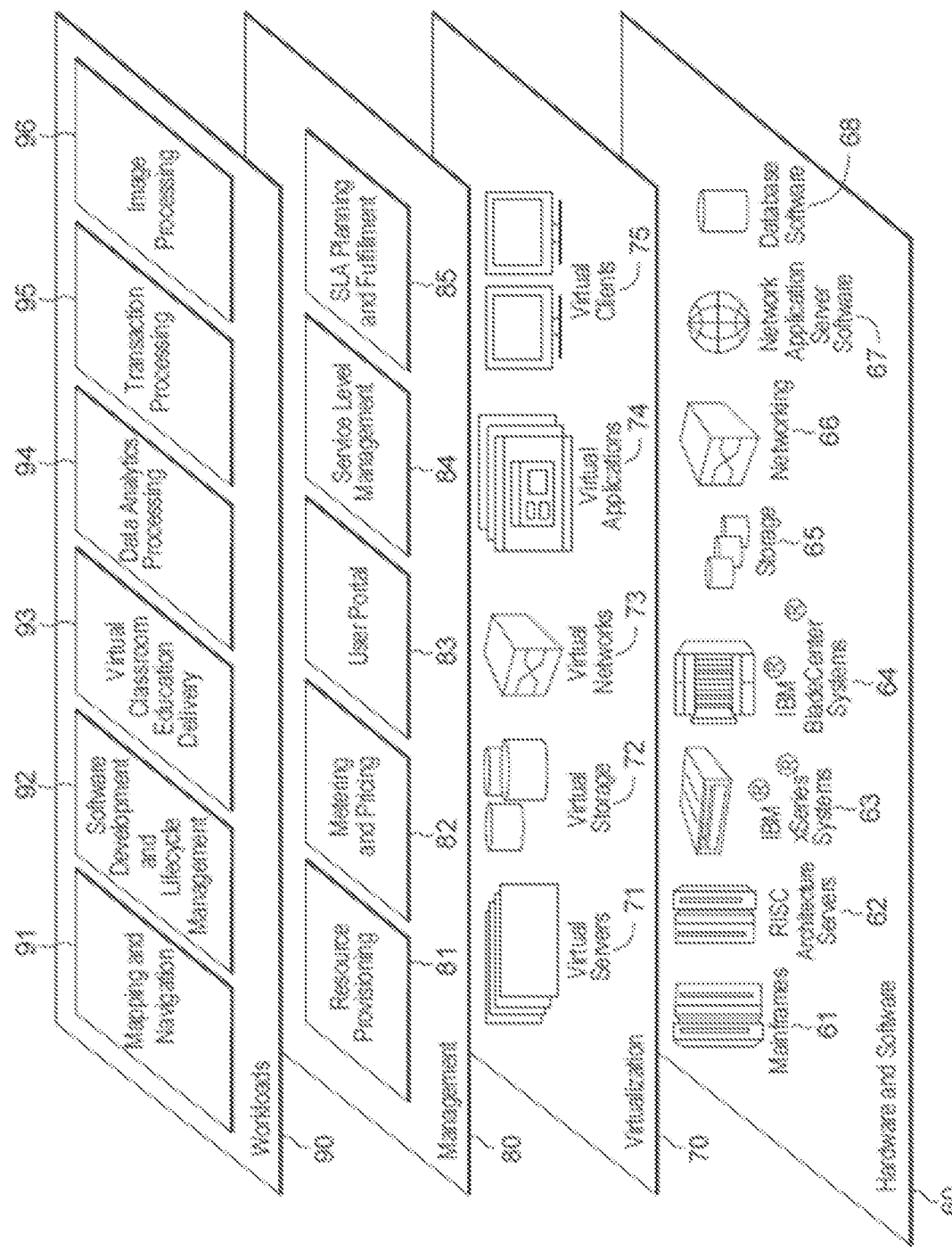
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that can be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 can be described in the general context of computer system-executable instructions, such as program processes, being executed by a computer system. Generally, program processes can include routines, programs, objects, components, logic, data structures, and so on that perform particular tasks or implement particular abstract data types. Computer system 12 can be practiced in distributed cloud computing environments where tasks are performed by remote processing devices that are linked through a communications network. In a distributed cloud computing environment, program processes can be located in both local and remote computer system storage media including memory storage devices.

As shown in FIG. 6, computer system 12 in cloud computing node 10 is shown in the form of a general-purpose computing device. The components of computer system 12 can include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media can be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program processes that are configured to carry out the functions of embodiments of the invention.

One or more program 40, having a set (at least one) of program processes 42, can be stored in memory 28 by way of example, and not limitation, as well as an operating system, one or more application programs, other program processes, and program data. Each of the operating system, one or more application programs, other program processes, and program data or some combination thereof, can include an implementation of the ensemble scoring engine 120 and the ensemble scoring optimizer 110 of FIG. 1, respectively. Program processes 42, as in the style emulation engine ensemble scoring engine 120 of the ensemble scoring optimizer 110 generally carry out the functions and/or methodologies of embodiments of the invention as described herein.

Computer system 12 can also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and processing components for the ensemble scoring optimization services as provided by the ensemble scoring optimizer 96, as described herein.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but can also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for optimizing real-time ensemble scoring, comprising:
   obtaining, by one or more processor, a request for a predicted score on input data in real-time;
   building, by the one or more processor, two or more base models by machine learning based on training data of a plurality of datasets respective to the two or more base models, wherein the training data represent respective relationships between each of the two or more base models and the predicted score;
   forming, by the one or more processor, a subset of the two or more base models in order of respective ranks of the two or more base models according to a preconfigured priority policy, wherein a number of the base models represented in the subset is less than a number of the two or more base models;
   calculating, by the one or more processor, a fitness score of the formed subset as a sum of weights respective to the base models in the subset, wherein the fitness score quantifies the accuracy of the formed subset;
   determining that the calculated fitness score for the subset satisfies an end condition for the predicted score;
   predicting an ensemble score by use of the subset corresponding to the fitness score by use of the input data, wherein the ensemble score is a sum of scores for respective base model instances in the subset, based on calculating, respective to all of the base model instances in the subset, a score corresponding to a base model instance of the respective base model instances in the subset as a product of a weight of the base model instance and a pass score of the base model instance when run with the input data, wherein the pass score equal to one (1) indicates that the base model instance in combination with the input data corresponding to the pass score produces a result that satisfies the end condition for the sub set;
   ascertaining that the ensemble score satisfies the end condition; and
   producing the ensemble score as the predicted score.

2. The computer implemented method of claim 1, further comprising:
   preparing, prior to the forming, a score log entry to record the subset from the forming, scores respective to the base model instances of the subset, and the ensemble score of the subset; and
   recording, subsequent to predicting, the subset, the scores respective to the base model instances of the subset, and the ensemble score in the score log entry from the preparing.

3. The computer implemented method of claim 1, further comprising:
   determining that the calculated fitness score does not satisfy the end condition;
   forming a next subset by adding another base model instance having a next highest priority according to the preconfigured priority policy; and
   calculating a next fitness score corresponding to the next subset by adding the weights respective to all base model instances in the next subset.

4. The computer implemented method of claim 3, further comprising:
   determining that the next fitness score satisfies the end condition;
   predicting the ensemble score by use of the next subset corresponding to the next fitness score, wherein the ensemble score is a sum of scores for all base model instances in the next subset; and
   ascertaining that the ensemble score satisfies the end condition; and
   producing the ensemble score as the predicted score.

5. The computer implemented method of claim 4, further comprising:
   preparing, prior to the forming the next subset, a next score log entry to record the next subset; and
   recording, subsequent to predicting, the next subset, a difference set of one or more base model instances which is present in the next subset but not present in the subset, scores respective to the one or more base model instances of the difference set, and the ensemble score of the next subset in the next score log entry from the preparing.

6. The computer implemented method of claim 1, further comprising:
   adjusting, prior to the calculating the fitness score, the weights respective to the base model instances based on respectively corresponding pass factors, wherein a pass factor for a base model instance indicates how likely certain input data is to pass the base model by generating the predicted score that meets the end condition for the subset.

7. A computer program product comprising:
   a computer readable storage medium readable by one or more processor and storing instructions for execution by the one or more processor for performing a method for optimizing real-time ensemble scoring, comprising:
   obtaining a request for a predicted score on input data in real-time;
   building two or more base models by machine learning based on training data of a plurality of datasets respective to the two or more base models, wherein the training data represent respective relationships between each of the two or more base models and the predicted score;
   forming a subset of the two or more base models in order of respective ranks of the two or more base models according to a preconfigured priority policy, wherein a number of the base models represented in the subset is less than or equal to a number of the two or more base models;
   calculating a fitness score of the formed subset as a sum of weights respective to the base models in the subset, wherein the fitness score quantifies the accuracy of the formed subset;
   determining that the calculated fitness score for the subset satisfies an end condition for the predicted score;
   predicting an ensemble score as a sum of scores respectively corresponding to base model instances, indicating instances of the base models in the subset operating on the input data, based on a pass score corresponding to a base model instance amongst the base model instances in the subset, wherein the pass score being equal to one (1) indicates that the base model instance in combination with the input data corresponding to the pass score produces a result that satisfies the end condition for the subset;

ascertaining that the ensemble score satisfies the end condition; and producing the ensemble score as the predicted score.

8. The computer program product of claim 7, further the predicting the ensemble score comprising:

calculating, respective to all of the base model instances in the subset, a score corresponding to a base model instance of the respective base model instances in the subset as a product of a weight of the base model instance and the pass score of the base model instance when run with the input data; and obtaining the ensemble score by adding the scores respective to all base model instances in the subset.

9. The computer program product of claim 8, further comprising:

preparing, prior to the forming, a score log entry to record the subset from the forming, scores respective to the base model instances of the subset, and the ensemble score of the subset; and recording, subsequent to predicting, the subset, the scores respective to the base model instances of the subset, and the ensemble score in the score log entry from the preparing.

10. The computer program product of claim 7, further comprising:

determining that the calculated fitness score does not satisfy the end condition;

forming a next subset by adding another base model instance having a next highest priority according to the preconfigured priority policy; and calculating a next fitness score corresponding to the next subset by adding the weights respective to all base model instances in the next subset.

11. The computer program product of claim 10, further comprising:

determining that the next fitness score satisfies the end condition;

predicting the ensemble score by use of the next subset corresponding to the next fitness score, wherein the ensemble score is a sum of scores for all base model instances in the next subset; and ascertaining that the ensemble score satisfies the end condition; and producing the ensemble score as the predicted score.

12. The computer program product of claim 11, further comprising:

preparing, prior to the forming the next subset, a next score log entry to record the next subset; and recording, subsequent to predicting, the next subset, a difference set of one or more base model instances which is present in the next subset but not present in the subset, scores respective to the one or more base model instances of the difference set, and the ensemble score of the next subset in the next score log entry from the preparing.

13. The computer program product of claim 7, further comprising:

adjusting, prior to the calculating the fitness score, the weights respective to the base model instances based on respectively corresponding pass factors, wherein a pass factor for a base model instance indicates how likely certain input data is to pass the base model.

14. A system comprising:

a memory;

one or more processor in communication with the memory; and program instructions executable by the one or more processor via the memory to perform a method for optimizing real-time ensemble scoring, comprising:

obtaining a request for a predicted score on input data in real-time;

building two or more base models by machine learning based on training data of a plurality of datasets respective to the two or more base models, wherein the training data represent respective relationships between each of the two or more base models and the predicted score;

forming a subset of the two or more base models in order of respective ranks of the two or more base models according to a preconfigured priority policy, wherein a number of the base models represented in the subset is less than or equal to a number of the two or more base models;

calculating a fitness score of the formed subset as a sum of weights respective to the base models in the subset, wherein the fitness score quantifies the accuracy of the formed subset;

determining that the calculated fitness score for the subset satisfies an end condition for the predicted score;

predicting an ensemble score as a sum of scores respectively corresponding to base model instances, indicating instances of the base models in the subset operating on the input data, based on a pass score corresponding to a base model instance amongst the base model instances in the subset, wherein the pass score being equal to one (1) indicates that the base model instance in combination with the input data corresponding to the pass score produces a result that satisfies the end condition for the subset;

ascertaining that the ensemble score satisfies the end condition; and producing the ensemble score as the predicted score.

15. The system of claim 14, further the predicting the ensemble score comprising:

calculating, respective to all of the base model instances in the subset, a score corresponding to a base model instance of the respective base model instances in the subset as a product of a weight of the base model instance and the pass score of the base model instance when run with the input data; and obtaining the ensemble score by adding the scores respective to all base model instances in the subset.

16. The system of claim 14, further comprising:

determining that the calculated fitness score does not satisfy the end condition;

forming a next subset by adding another base model instance having a next highest priority according to the preconfigured priority policy; and calculating a next fitness score corresponding to the next subset by adding the weights respective to all base model instances in the next subset.

17. The computer program product of claim 7, further comprising:

prior to the forming the subset, building two or more base models by machine learning based on the training data of a plurality of datasets respective to the two or more base models, wherein the training data represent respective relationships between each of the two or more base models and the predicted score.

18. The computer program product of claim 7, further comprising:

prior to the forming the subset, building two or more base models by machine learning based on the training data of a plurality of datasets respective to the two or more base models, wherein the training data represent respective relationships between each of the two or more base models and the predicted score;

subsequent to the calculating the fitness score of the subset, determining that the calculated fitness score for the subset satisfies the end condition for the predicted score; and predicting the ensemble score by use of the subset corresponding to the fitness score by use of input data provided with the request for the predicted score, wherein the ensemble score is a sum of scores for respective base model instances in the subset, comprising:

calculating, each of the scores respective to all of the base model instances in the subset, as a product of a weight of the base model instance and a pass score of the base model instance when run with the input data, wherein the pass score equal to one (1) indicates that the base model instance in combination with the input data corresponding to the pass score produces a result that satisfies the end condition for the subset.

19. The computer program product of claim 7, further comprising:

prior to the forming the subset, building two or more base models by machine learning based on the training data of a plurality of datasets respective to the two or more base models, wherein the training data represent respective relationships between each of the two or more base models and the predicted score;

subsequent to the calculating the fitness score of the subset, determining that the calculated fitness score for the subset satisfies the end condition for the predicted score;

predicting the ensemble score by use of the subset corresponding to the fitness score by use of input data provided with the request for the predicted score, wherein the ensemble score is a sum of scores for respective base model instances in the subset, comprising:

calculating, each of the scores respective to all of the base model instances in the subset, as a product of a weight of the base model instance and a pass score of the base model instance when run with the input data, wherein the pass score equal to one (1) indicates that the base model instance in combination with the input data corresponding to the pass score produces a result that satisfies the end condition for the subset; and ascertaining that the ensemble score satisfies the end condition for the predicted score; and producing the ensemble score as the predicted score.

20. The computer program product of claim 7, further comprising:

prior to the forming the subset, building two or more base models by machine learning based on the training data of a plurality of datasets respective to the two or more base models, wherein the training data represent respective relationships between each of the two or more base models and the predicted score;

subsequent to the calculating the fitness score of the subset, determining that the calculated fitness score for the subset does not satisfy the end condition for the predicted score;

forming a next subset by replacing a base model instance that corresponds to a pass score equal to zero (0) with another base model instance having a next highest priority according to the preconfigured priority policy, wherein the preconfigured priority policy is selected from the group consisting of CPU usage, memory usage, and response time, required by each of base model instances in the next subset; and calculating a next fitness score corresponding to the next subset by adding the weights respective to all base model instances in the next subset;

predicting the ensemble score by use of the next subset corresponding to the next fitness score by use of input data provided with the request for the predicted score, wherein the ensemble score is a sum of scores for respective base model instances in the next subset, comprising:

calculating, each of the scores respective to all of the base model instances in the next subset, as a product of a weight of the base model instance and a pass score of the base model instance when run with the input data, wherein the pass score equal to one (1) indicates that the base model instance in combination with the input data corresponding to the pass score produces a result that satisfies the end condition for the next subset; and ascertaining that the ensemble score satisfies the end condition for the predicted score; and producing the ensemble score as the predicted score.

* * * * *